US012663891B1

(12) United States Patent
Leisl, III et al.

(10) Patent No.: US 12,663,891 B1
(45) Date of Patent: Jun. 23, 2026

(54) USER INTERFACE ASSEMBLY WITH LIGHT GUIDES FOR A DOMESTIC APPLIANCE

(71) Applicant: Haier US Appliance Solutions, Inc., Wilmington, DE (US)

(72) Inventors: Donald James Leisl, III, Louisville, KY (US); Richard Gary Woodham, Jr., Taylorsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/055,589

(22) Filed: Feb. 18, 2025

(51) Int. Cl.
| *G06F 3/041* | (2006.01) |
| *D06F 34/32* | (2020.01) |
| *D06F 105/58* | (2020.01) |
| *G06F 3/044* | (2006.01) |

(52) U.S. Cl.
CPC ........... *G06F 3/0416* (2013.01); *D06F 34/32* (2020.02); *G06F 3/044* (2013.01); *D06F 2105/58* (2020.02)

(58) Field of Classification Search
None
See application file for complete search history.

(56) References Cited

U.S. PATENT DOCUMENTS

| 7,705,257 B2 | 4/2010 | Arione et al. |
| 7,923,654 B2 | 4/2011 | Zeijlon et al. |

| 8,258,987 B2 | 9/2012 | Anorozo | |
| 9,088,283 B2 | 7/2015 | Wu et al. | |
| 9,709,284 B2 | 7/2017 | Bach et al. | |
| 10,289,257 B2 | 5/2019 | Nakamura et al. | |
| 10,581,430 B2 | 3/2020 | Wilford | |
| 2012/0147584 A1* | 6/2012 | Wu | ........................ G06F 3/0202 |
| | | | 362/23.16 |
| 2018/0159533 A1* | 6/2018 | Wilford | ............... H03K 17/962 |
| 2020/0018004 A1* | 1/2020 | Leisl, III | ................. D06F 34/32 |

FOREIGN PATENT DOCUMENTS

| CN | 218676011 U | 3/2023 |
| JP | 2018180347 A | 11/2018 |
| WO | WO2015019126 A1 | 2/2015 |

* cited by examiner

*Primary Examiner* — Stephen T. Reed
(74) *Attorney, Agent, or Firm* — Dority & Manning, P.A.

(57) ABSTRACT

A user interface assembly for a domestic appliance may define an axial direction and a radial direction. The user interface assembly may include a fascia. The fascia may include a consumer icon. The user interface assembly may include a main control board coupled to the fascia. The main control board may define an aperture therethrough that may be aligned with the consumer icon along the axial direction. The user interface assembly may include a light guide disposed within the aperture. The main control board and the light guide may define a perimeter gap therebetween. The user interface assembly may include a capacitive touch sensor module (CTSM) electrically coupled to the main control board. The CTSM may include a capacitive touch sensor and a light source. The capacitive touch sensor may be aligned with the consumer icon along the axial direction. The light source may be positioned within the perimeter gap.

20 Claims, 4 Drawing Sheets

USER INTERFACE ASSEMBLY WITH LIGHT GUIDES FOR A DOMESTIC APPLIANCE

FIELD OF THE DISCLOSURE

The present subject matter relates generally to domestic appliances, and more particularly to a user interface assembly for a domestic appliance.

BACKGROUND OF THE DISCLOSURE

Domestic appliances, such as washing machine appliances, dryer appliances, dishwashing appliances, refrigerator appliances, oven appliances, microwave appliances, etc., generally include a user interface or control panel. Using the control panel, an appliance user can input control commands to the appliance and operate the appliance. Certain control panels include touch sensors, such as capacitive touch sensors, to detect an electrical field generated by a user's body to operate or engage the touch sensor. In particular, capacitive touch sensors can detect a change in capacitance when the user touches the control panel.

Touch sensors have various benefits. For example, touch sensors can assist with providing a clean appearance for an associated or corresponding consumer appliance. In particular, touch sensors are frequently positioned behind a dielectric panel on a rigid or semi-rigid printed circuit board, sometimes also referred to as a "PCB." A user touches an outer surface of the dielectric panel opposite the touch sensors to actuate the touch sensors. The smooth outer surface can have a pleasant cosmetic appearance or can be less prone to wear, especially when compared to existing touch inputs (e.g., tactile buttons, knobs, or the like).

Often, it can be desirable to provide one or more lights or light sources that are configured for illuminating a portion of the user interface, for instance, a portion of the user interface that a user must touch in order to engage a particular touch sensor. Such light sources and illumination can provide feedback to a user or generally indicate the presence of a touch sensor.

In spite of these advantages, however, incorporating a touch sensor and a light source within a user interface can create various challenges (e.g., for assembly or manufacture of the user interface). For instance, although it can be desirable to mount a touch sensor relatively close to the dielectric panel (e.g., in order to readily detect a user's electrical field), light sources must generally be held relatively far from the dielectric panel. The relatively far distance needed for light source can, for instance, be necessary in order to ensure adequate dispersion of light emissions (e.g., to one or more light guides) without bleeding to surrounding areas, which might cause confusion or detract from the overall appearance. However, such construction of the user interface can be costly and can cause spacing constraints within the user interface.

Accordingly, a user interface assembly for a domestic appliance that obviates one or more of the above mentioned drawbacks would be beneficial.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a user interface assembly for a domestic appliance is provided. The user interface assembly may define an axial direction and a radial direction. The user interface assembly may include a fascia. The fascia may include a consumer icon. The user interface assembly may include a main control board coupled to the fascia. The main control board may define an aperture therethrough that may be aligned with the consumer icon along the axial direction. The user interface assembly may include a light guide disposed within the aperture. The main control board and the light guide may define a perimeter gap therebetween. The user interface assembly may include a capacitive touch sensor module may be electrically coupled to the main control board. The capacitive touch sensor module may include a capacitive touch sensor and a light source. The capacitive touch sensor may be aligned with the consumer icon along the axial direction. The light source may be positioned within the perimeter gap.

In another exemplary aspect of the present disclosure, a domestic appliance is provided. The domestic appliance may include a cabinet forming a receiving space. The domestic appliance may include a user interface assembly provided on the cabinet. The user interface assembly may define an axial direction and a radial direction. The user interface assembly may include a fascia. The fascia may include a consumer icon. The user interface assembly may include a main control board coupled to the fascia. The main control board may define an aperture therethrough. The aperture may be aligned with the consumer icon along the axial direction. The user interface assembly may include a light guide may be disposed within the aperture. The main control board and the light guide may define a perimeter gap therebetween. The capacitive touch sensor module may be electrically coupled to the main control board. The capacitive touch sensor module may include a capacitive touch sensor and a light source. The capacitive touch sensor may be aligned with the consumer icon along the axial direction. The light source may be positioned within the perimeter gap.

In yet another exemplary aspect of the present disclosure, a user interface assembly for a domestic appliance is provided. The user interface assembly may define an axial direction and a radial direction. The user interface assembly may include a fascia. The fascia may include a first panel face and a second panel face spaced apart along the axial direction. The fascia may further include a plurality of consumer icons that may extend between the first panel face and the second panel face. The user interface assembly may include a main control board. The main control board may include a first board face and a second board face spaced apart along the axial direction. The first board face may be coupled to the second panel face. The main control board may define a plurality of apertures therethrough. Each aperture of the plurality of apertures may be separated from an adjacent aperture of the plurality of apertures via a septum of the main control board. Each aperture of the plurality of apertures may be aligned with a corresponding consumer icon of the plurality of consumer icons along the axial direction. The user interface assembly may include a plurality of light guides. Each light guide of the plurality of light guides may be positioned within a discrete aperture of the plurality of apertures. Each light guide of plurality of light guides and the discrete aperture of the plurality of apertures may define a radial gap therebetween. Each light guide of the plurality of light guides may include a diffusive portion and a translucent portion positioned around the diffusive portion. The user interface assembly may include a capacitive touch sensor module that may be electrically coupled to the main control board. The capacitive touch sensor module may include a secondary control board. The secondary control board may include a first module face and a second module face spaced apart along the axial direction. The capacitive touch sensor module may include a plurality of capacitive touch sensors that may be disposed at the first module face. The capacitive touch sensor module may include a plurality of light sources that may be disposed at the first module face. The plurality of light sources may be positioned within a radial gap around the plurality of capacitive touch sensors. The plurality of light guides may each be adhered to the first module face over a corresponding capacitive touch sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
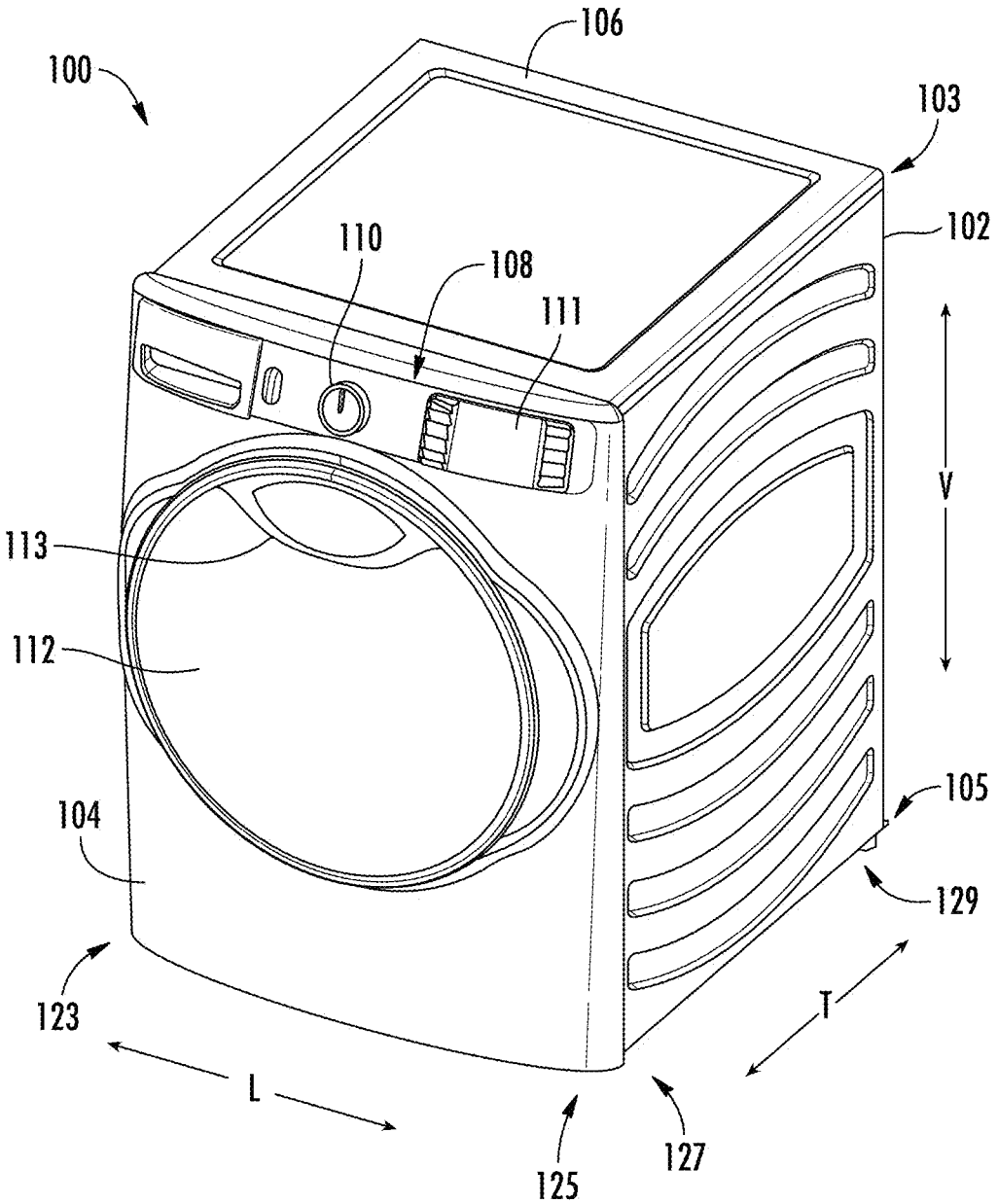
FIG. 1 provides a front perspective view of a laundry treatment appliance according to one or more exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Embodiments of the present disclosure provide a user interface assembly for a domestic appliance. The user interface assembly can be mounted or attached to the domestic appliance. The user interface assembly can include a fascia with a first panel face and a second panel face spaced apart along an axial direction of the user interface assembly. The first panel face being a consumer facing side that can be engaged with by the user. The second panel face being coupled to a main control board of the user interface assembly. The fascia can include one or more consumer icons. The consumer icons can be configured as touch points for a consumer to engage with, for instance, to selectively trigger operation of the domestic appliance. The consumer icons can include a light permissive portion (e.g., a dielectric and transparent or translucent portion of the user interface assembly) that allows light to pass through, for instance, to illuminate the consumer icon.

According to embodiments of the present disclosure, the main control board of the user interface assembly defines one or more apertures therethrough for housing and aligning components of the user interface assembly. As will be appreciated in more detail below, the one or more apertures may contain or house components of the user interface assembly such as capacitive touch sensors, light sources, or light guides. In particular, the user interface assembly can include a capacitive touch sensor module including a capacitive touch sensor and a light source. The user interface assembly can further include a light guide adhered to a first module face of the capacitive touch sensor module over the capacitive touch sensor. The light sources may be disposed within a perimeter gap defined between the light guide and the main control board, for instance, within the aperture.

According to embodiments of the present disclosure, the user interface assembly can include a controller that is mounted to the main control board. The capacitive touch sensor module can be electrically coupled to the main control board such that the controller can control operation of the capacitive touch sensor module and components thereof. For example, the controller can control operation of the light sources or the capacitive touch sensor of the capacitive touch sensor module via the electrical connection between the main control board and the capacitive touch sensor module. Notably, the configuration of the user interface assembly permits the user interface assembly to employ a single controller solution that can illuminate the consumer icons at the fascia (e.g., when compared to user interface assemblies that utilize multiple controllers to illuminate consumer icons at a fascia). Further, the user interface assembly utilizes light guides positioned in the apertures to advantageously direct light emissions from the light sources to or toward a corresponding consumer icons (e.g., to illuminate the corresponding consumer icon). Moreover, the main control board (and portions thereof) advantageously limit light bleed to adjacent consumer icons (e.g., that may be common in existing user interface assemblies).

Figure 2:
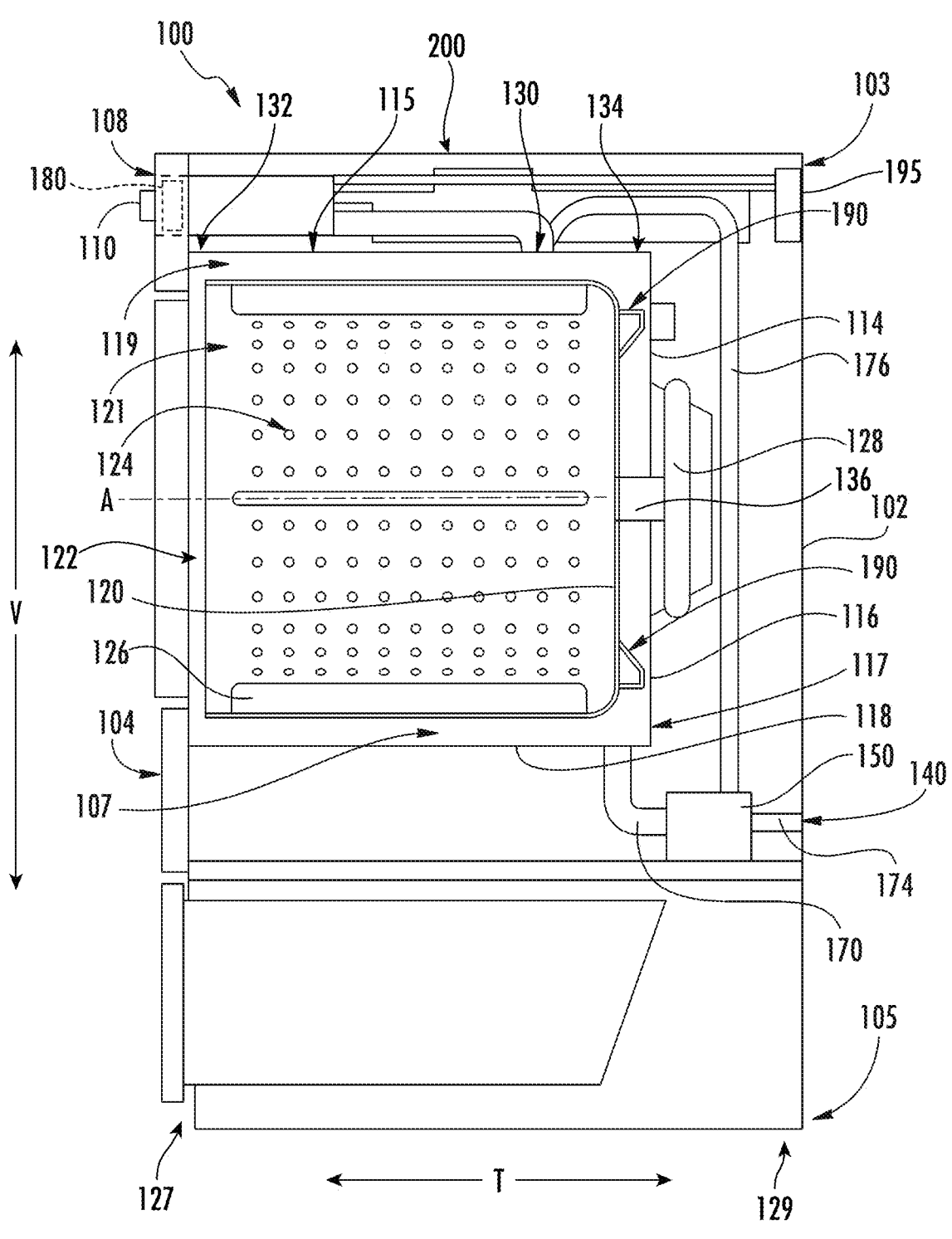
FIG. 2 provides a side schematic view of the exemplary laundry treatment appliance of FIG. 1.

FIGS. 1 and 2 provide various views of a laundry treatment appliance 100 according to one exemplary embodiment of the present disclosure. For instance, the laundry treatment appliance 100 may perform each of a wash cycle or operation and a drying cycle or operation. In particular, FIG. 1 provides a front, perspective view of the laundry treatment appliance 100 and FIG. 2 provides a side, section view of the laundry treatment appliance 100. As shown in FIG. 1, the laundry treatment appliance 100 may include a cabinet 102 that may extend between a top 103 and a bottom 105, e.g., along a vertical direction V. Cabinet 102 may also extend between a first side 123 and a second side 125, e.g., along a lateral direction L, and between a front 127 and a rear 129, e.g., along a transverse direction T. The vertical direction V, the lateral direction L, and transverse direction T defined by the laundry treatment appliance 100 may be mutually perpendicular and together define an orthogonal direction system.

Cabinet 102 may include a front panel 104. A door 112 may be mounted to front panel 104 and may be rotatable between an open position and a closed position. In the open position, access to a wash drum or basket 120 (e.g., FIG. 2) located within cabinet 102, for instance, to a user, may be permitted. In this closed position (e.g., FIGS. 1 and 2), access to the basket 120 is hindered, for instance, to a user.

A user may pull on a handle 113 in order to selectively adjust door 112 between the open and closed positions. Cabinet 102 may also include a top panel 106 positioned at top 103 of cabinet 102.

A control panel 108 may be coupled to front panel 104. The control panel 108 may include a user interface (e.g., user interface assembly 300 described in more detail below). The user interface of the control panel 108 may include a plurality of input selectors 110. The input selectors 110 may include tactile input selectors (e.g., knobs, tactile buttons, or the like) or touch sensitive input selectors (e.g., capacitive touch sensitive input selectors, such as those described in more detail below). The input selectors 110 of the user interface may provide a user interface input for operator selection of machine cycles and features. For example, in some embodiments, control panel 108 includes a display 111 (e.g., FIG. 1) configured to present or indicate selected features, a countdown timer, or other items of interest to machine users.

As shown in FIG. 2, a tub 114 may define a wash fluid compartment 119 configured for receipt of a washing fluid. Thus, tub 114 is configured for containing washing fluid, e.g., during operation of laundry treatment appliance 100 (e.g., a wash cycle or operation). Washing fluid disposed within tub 114 may include, for example, at least one of water, fabric softener, bleach, and detergent. Tub 114 may include a back wall 116 and a pair of sidewalls 118 (e.g., that may be spaced apart along the lateral direction L). The pair of sidewalls 118 may extend between a top 115 and a bottom 117, e.g., along the vertical direction V. Further, tub 114 may extend between a front 132 and a rear 134, e.g., along the transverse direction T.

Basket 120 may be rotatably mounted within tub 114 in a spaced apart relationship from the pair of sidewalls 118 and the back wall 116. One or more bearing assemblies may be placed between basket 120 and tub 114 and may allow for rotational movement of basket 120 relative to tub 114. Basket 120 may define a wash chamber 121 and an opening 122. Opening 122 of basket 120 may permit access to wash chamber 121 of basket 120, e.g., in order to load articles into basket 120 and remove articles from basket 120. Basket 120 may also define a plurality of perforations 124 to facilitate fluid communication between an interior of basket 120 and tub 114. A sump 107 is defined by tub 114 and is configured for receipt of washing fluid during operation of appliance 100. For example, during operation of appliance 100 (e.g., the wash cycle), washing fluid may be urged by gravity from basket 120 to sump 107 through the plurality of perforations 124.

A spout 130 may be configured for directing a flow of fluid into tub 114. Spout 130 may be in fluid communication with a water supply, such as a municipal water supply, in order to direct fluid (e.g., clean water) into tub 114. A pump assembly 150 (shown schematically in FIG. 2) may be located beneath tub 114 for draining tub 114 of fluid. Pump assembly 150 may be in fluid communication with sump 107 of tub 114 via a conduit 170. Thus, conduit 170 directs fluid from tub 114 to pump assembly 150. Pump assembly 150 may also be in fluid communication with a drain 140 via piping 174. Pump assembly 150 can urge fluid disposed in sump 107 to drain 140 during operation of appliance 100 in order to remove fluid from tub 114. Fluid received by drain 140 from pump assembly 150 is directed out of appliance 100, e.g., to a sewer or septic system.

In addition, pump assembly 150 may be configured for recirculating washing fluid within tub 114. Thus, pump assembly 150 may be configured for urging fluid from sump 107, e.g., to spout 130. For example, pump assembly 150 may urge washing fluid in sump 107 to spout 130 via hose 176 during operation of appliance 100 in order to assist in cleaning articles disposed in basket 120. It should be understood that conduit 170, piping 174, and hose 176 may be constructed of any suitable mechanism for directing fluid, e.g., a pipe, duct, conduit, hose, or tube, and are not limited to any particular type of mechanism.

A motor 128 may be in mechanical communication with basket 120 in order to selectively rotate basket 120, e.g., during an agitation or a rinse cycle of laundry treatment appliance 100 as described below. In particular, a shaft 136 mechanically may couple motor 128 with basket 120 and drivingly rotates basket 120 about a shaft or central axis A, e.g., during a spin cycle. Ribs 126 extend from basket 120 into wash chamber 121. Ribs 126 assist agitation of articles disposed within wash chamber 121 during operation of laundry treatment appliance 100. For example, ribs 126 may lift articles disposed in basket 120 during rotation of basket 120.

Also shown in FIG. 2 is an optional balancing apparatus 190. Balancing apparatus 190 may, for example, include a balancing ring. The balancing ring may define an annular cavity in which a balancing material may be free to rotate and move about. For example, the balancing material may be a fluid such as water or may be a solid such as balancing balls. In addition, the balancing ring may include one or more interior baffles. Although a single balancing ring or apparatus 190 is shown in FIG. 2, any number of such rings or apparatuses may be included in laundry treatment appliance 100 and may be placed according to any known or desirable configuration. For example, two balancing rings may be respectively placed at the front and back of basket 120.

As further shown in FIG. 2, laundry treatment appliance 100 may include a dispenser assembly 200. Dispenser assembly 200 may include features for receiving various wash treatment additives (e.g., fluid detergent, powder detergent, fabric softener, bleach, powder or any other suitable liquid) and dispensing or directing them to wash fluid compartment 119 of tub 114 during operation of laundry treatment appliance 100.

Operation of laundry treatment appliance 100 may be controlled by a processing device or controller 180 that is operatively coupled to control panel 108 for user manipulation to select various features (e.g., washing or drying cycles, as well as other features). In response to user manipulation of control panel 108, controller 180 may operate the various components of laundry treatment appliance 100 to execute selected machine cycles and features.

Controller 180 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog or digital logic circuitry (such as switches, amplifiers, integrators, comparators, flip-flops, AND/OR gates, or the like) to perform control functionality instead of relying upon software. Control panel 108 and other components of laundry treatment appliance 100 may be in communication with controller 180 via one or more signal lines or shared communication busses.

While described in the context of a specific embodiment of horizontal axis laundry treatment appliance 100, it will be understood that horizontal axis laundry treatment appliance 100 is provided by way of example only. Other laundry treatment appliances having different configurations, different appearances, or different features may also be utilized with the present subject matter as well, including, for example, vertical axis laundry treatment appliances. Additionally or alternatively, it should be noted that the features described herein may be incorporated into any suitable domestic appliance, including but not limited to refrigerator appliances, cooking or oven appliances, microwave appliances, air conditioner appliances, dishwasher appliances, and the like. Thus, the teachings of the present disclosure are not limited to use with laundry treatment appliance 100.

Figure 3:
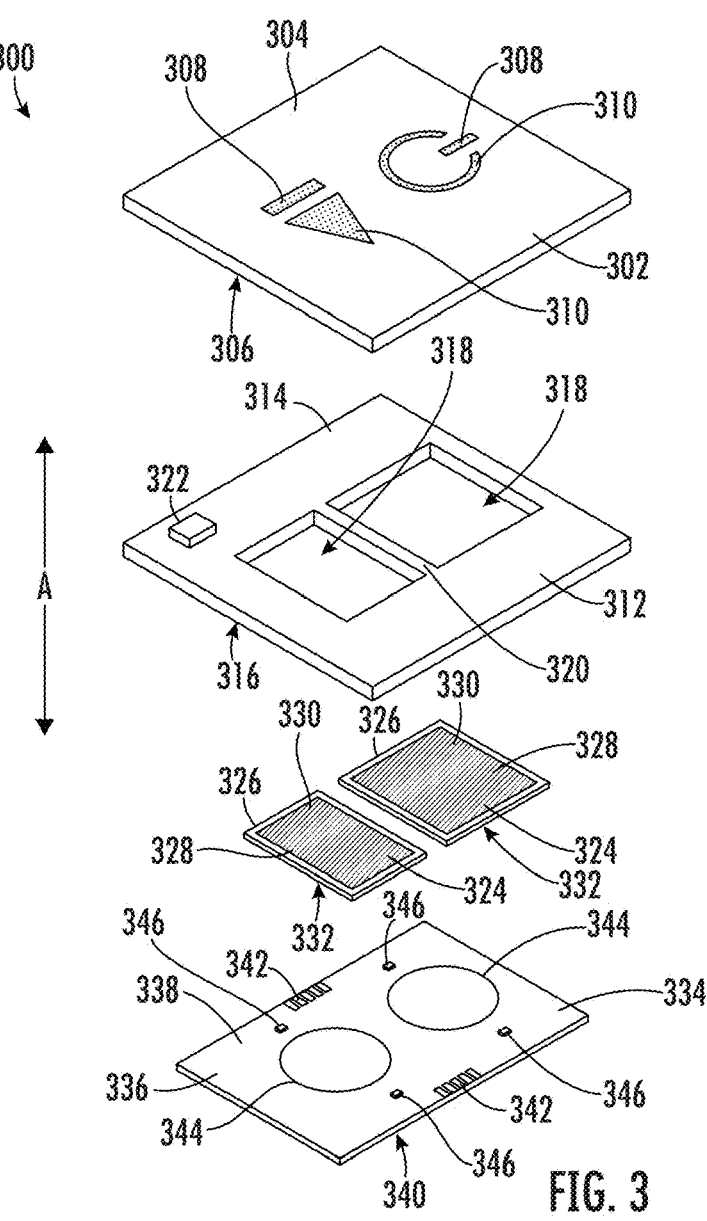
FIG. 3 provides an exploded view of a user interface assembly according to one or more exemplary embodiments of the present disclosure.
Figure 4:
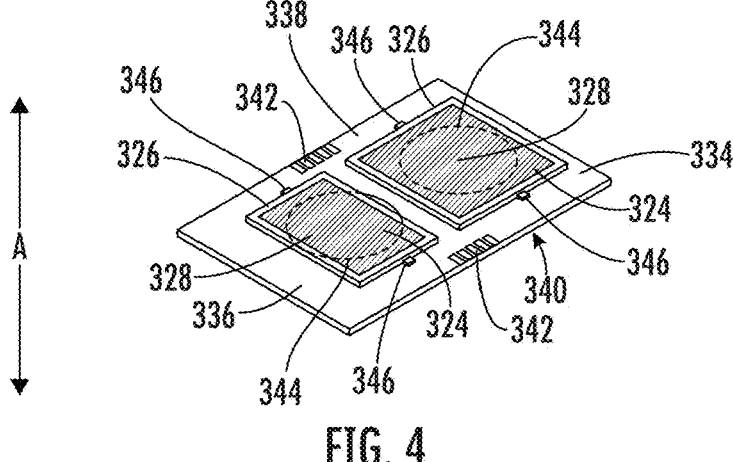
FIG. 4 provides a perspective view of a portion of the user interface assembly of FIG. 3.
Figure 5:
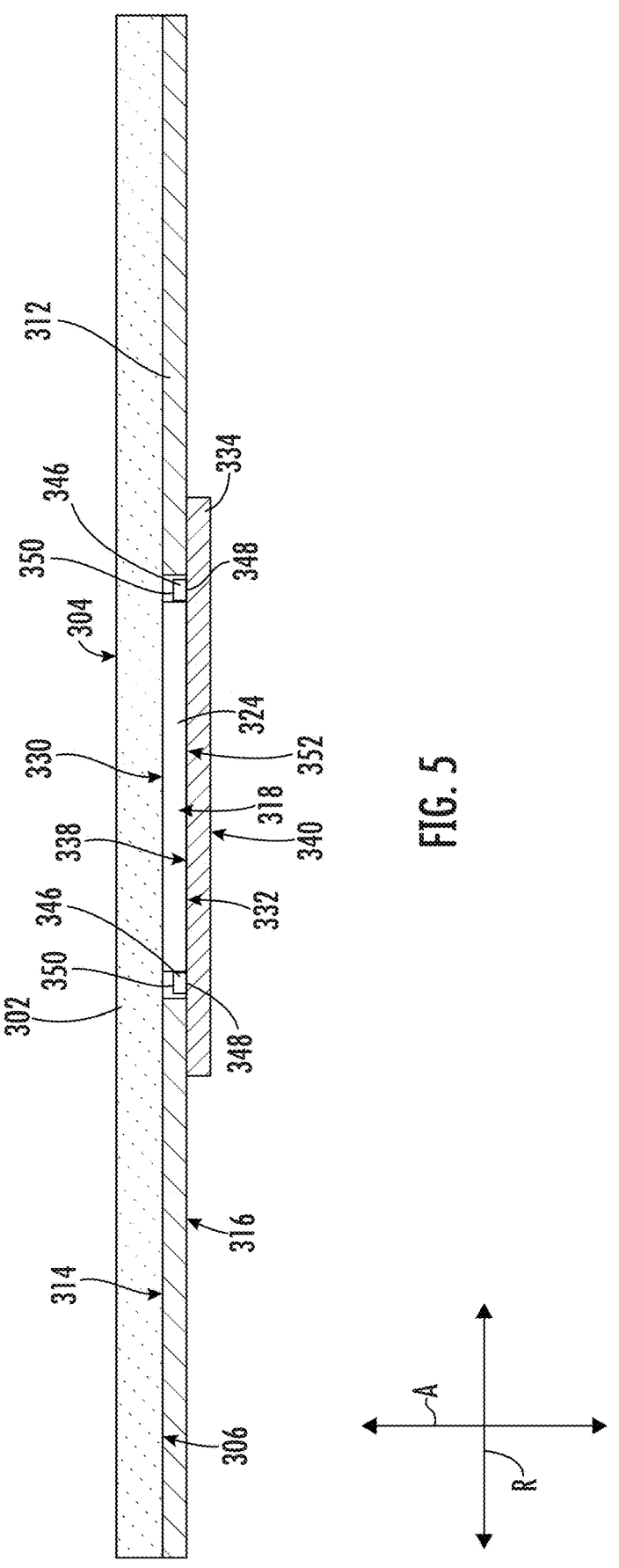
FIG. 5 provides a cross-sectional view of the user interface assembly of FIG. 3.

Referring now to FIGS. 3 through 5, various embodiments of a user interface assembly 300 for the laundry treatment appliance 100 according to one or more embodiments of the present disclosure are provided. The user interface assembly 300 may define an axial direction A extending between a front end (e.g., at a top panel face, described in more detail below) of the user interface assembly 300 to a back end (e.g., at a second module face 340, described in more detail below) of the user interface assembly 300 and a radial direction R perpendicular to the axial direction A. In some embodiments, the front end is disposed at the front 127 of the laundry treatment appliance 100 (e.g., to receive a user's touch or input) while the back end is disposed within cabinet 102 and is generally inaccessible to a user during operation of the laundry treatment appliance 100. For instance, the cabinet 102 may form a receiving space such that the user interface assembly 300 may be provided on or mounted to the cabinet. In some such embodiments, the front end is positioned forward of the back end along the transverse direction T (e.g., FIG. 1). Additionally, in some such embodiments, the axial direction A is perpendicular to the lateral direction L (e.g., parallel to the transverse direction T or vertical direction V).

The user interface assembly 300 may include a fascia 302. The fascia 302 may define an exterior or outermost surface of the user interface assembly 300, for instance, along the axial direction A. The fascia 302 may include a first panel face 304 and a second panel face 306, spaced apart along the axial direction A. The first panel face 304 may be a consumer facing portion or face of the user interface assembly 300 that may be engaged with by the user. In this regard, the fascia 302 may be a consumer facing portion of the user interface assembly 300. The fascia 302 may include a plurality of consumer icons 308 that may extend between the first panel face 304 and the second panel face 306. The consumer icons 308 may include or be provided as icons or graphics that may be depicted on the fascia 302. The consumer icons 308 may define any suitable operational indicator having a unique shape. For instance, the consumer icons 308 may indicate operational functions of the laundry treatment appliance 100, such as a power on/off operation, a start/stop operation, or the like.

As will be appreciated in more detail below, the consumer icons 308 of the fascia 302 may be selectively illuminated such that viewability of the consumer icons 308 is improved for a user. For instance, the consumer icons 308 may include a light permissive portion 310 (e.g., a transparent or translucent portion). The light permissive portion 310 may be configured for permitting light emission (e.g., light emissions from light sources 346 described in more detail below). For instance, light permissive portion 310 may include a transparent material, such as acrylic, polycarbonate, glass, or the like. Thus, at least a portion of light emissions that are directed from light sources 346 may be transmitted through the light permissive portion 310 of the consumer icons 308 (e.g., into the ambient area in front of the user interface assembly 300). In some embodiments, the light permissive portion 310 corresponds with the consumer icon such that the light permissive portion 310 identifies and defines the consumer icon. In other words, the light permissive portion 310 may define the unique shape of the consumer icon. In addition, the light permissive portion 310 may be constructed from a dielectric and solid nonpermeable material. The dielectric material of the consumer icon may permit touch input capabilities of the user interface assembly 300.

The user interface assembly 300 may include a main control board 312 attached or coupled to the fascia 302. The main control board 312 may include a first board face 314 and a second board face 316 spaced apart along the axial direction A. The first board face 314 may be attached or coupled to the second panel face 306 of the fascia 302. The main control board 312 may define a plurality of apertures 318 that each extend through the first board face 314 and the second board face 316. The plurality of apertures 318 may be further defined by one or more septum/septa 320 of the main control board 312. For instance, the one or more septa 320 may separate adjacent apertures 318 from one another, such that each aperture 318 may align with a discrete consumer icon 308, for instance along the axial direction A. As illustrated in FIG. 3, the main control board 312 includes a discrete septum 320 separating two adjacent apertures 318. However, in additional or alternative embodiments, the main control board 312 may include any suitable number of septa 320 defining any suitable number of apertures 318.

The main control board 312 may include or be provided a printed circuit board (PCB) onto which one or more electrical components and electrical circuit paths may be provided. In particular, the main control board 312 may include a controller 322 mounted thereto. The controller 322 may include a memory storage device and microprocessor, such as a general or special purpose microprocessor operable to execute programming instructions or micro-control code. The memory device may represent random access memory such as DRAM, or read only memory such as ROM or FLASH. In one embodiment, the processor executes programming instructions stored in memory. Alternatively, the controller 322 may be constructed without using a microprocessor, e.g., using a combination of discrete analog or digital logic circuitry (such as switches, amplifiers, integrators, comparators, flip-flops, AND gates, and the like) to perform control functionality instead of relying upon software. In some embodiments, the controller 322 is in communication with controller 180 via one or more signal lines or shared communication busses. In addition, the controller 322 may be in communication with a capacitive touch sensor module 334 via one or more connection pads 342 (e.g., described in more detail below), for instance, to control operation of the capacitive touch sensor module 334 and components thereof.

However, in additional or alternative embodiments, the controller 180 may be provided as the controller 322. For instance, the controller 180 may be mounted to the main control board 312, and may be configured to control operation of the laundry treatment appliance 100 and components thereof, such as components of the user interface assembly 300.

The user interface assembly 300 may include plurality of light guides 324 for guiding light emissions to or toward the fascia 302 and more particular, to or toward the consumer icons 308. Each light guide of the plurality of light guides 324 may be disposed within a particular aperture of the plurality of apertures 318. The plurality of light guides 324 each may include a first portion 326 and a second portion 328. In the exemplary embodiment, the first portion 326 is positioned around a perimeter of the second portion 328. In some embodiments, the first portion 326 includes or is formed from any suitable transparent material. For example, the first portion 326 may include or be formed from glass, transparent plastic, transparent acrylic, or the like. In some embodiments, the second portion 328 includes or is formed from any suitable translucent or a diffusive material (e.g., materials that may soften or spread the emission of light). For example, the second portion 328 may include or be formed from frosted acrylic, frosted plastic, treated glass, or any other suitable material that may soften or spread the emission of light. In addition, the plurality of light guides 324 may each include a first guide face 330 and a second guide face 332 that may be spaced apart, for instance, along the axial direction A.

The user interface assembly 300 may include one or more capacitive touch sensor modules (CTSM) 334 electrically coupled to the main control board 312. Each CTSM 334 may include a secondary control board 336. The secondary control board 336 may provide a PCB onto which one or more electrical components and electrical circuit paths may be provided. The secondary control board 336 may extend between a first module face 338 and a second module face 340, for instance, along the axial direction A. The first module face 338 may be electrically coupled to the second board face 316 of the main control board 312. The first module face 338 may include one or more connection pads 342 mounted thereto. The one or more connection pads 342 may define an area on the secondary control board 336 that the main control board 312 may be electrically coupled to. For instance, the connection pads 342 may include or be configured as solder pads that may be used to electrically couple (e.g., solder) the secondary control board 336 to the main control board 312. In this regard, electrical components that may be mounted to the secondary control board 336 may be in operative communication with the controller 322.

The CTSM 334 may include a touch sensor 344 mounted to the secondary control board 336, for instance, to the first module face 338. The touch sensor 344 may be provided as any suitable sensor for detecting an electrical field generated by a user's body and detectable through a rigid dielectric panel (e.g., through the consumer icons 308). For example, the touch sensor 344 may include or be provided as a capacitive sensor that includes an electrical capacitor configured for detecting variation in capacitance. In this regard, the touch sensor 344 may be capable of detecting when a finger or another conductive material (e.g., with a dielectric difference from the ambient air) contacts or approaches the corresponding consumer icon 308. When a user touches the fascia 302 at one of the consumer icons 308, the corresponding touch sensor 344 may be triggered. Along with being mounted to the secondary control board 336, the touch sensor 344 may be in operative communication with controller 322. In this regard, when the touch sensor 344 is triggered, a corresponding signal may be sent to controller 322.

Additionally, the CTSM 334 may include a plurality of light sources 346 mounted to the secondary control board 336. In particular, the plurality of light sources 346 are mounted at (e.g., supported on) the first module face 338 of the secondary control board 336. The plurality of light sources 346 may be interfaced with or positioned proximate to the first portions 326 of the plurality of light guides 324, and may be positioned radially around the touch sensors 344 on the first module face 338. The light sources 346 each may include a proximal end 348 at the first module face 338, and a distal end 350 spaced apart from the proximal end 348 along the axial direction A. The distal end 350 may be positioned between the second panel face 306 and the first module face 338 along the axial direction A. The light sources 346 may be configured for emitting light along the radial direction R, for instance, to or toward a particular light guide 324. For example, the light sources 346 may be provided as any suitable electrical light source, such as a side-emitting light emitting diode, fluorescent bulb, halogen bulb, or the like, capable of emitting light along the radial direction R to or toward the first portion 326 of a particular light guide 324. Moreover, light sources 346 may be electrically coupled to the main control board 312 such that the light source is in operative communication with the controller 322. Activation or illumination of light source may be generally controlled by controller 322 (e.g., to indicate a user input, state of the appliance, state of an operation cycle, or any other relevant information to a user).

Each light guide of the plurality of light guides 324 may be adhered to the first module face 338 of the CTSM 334, for instance, over a particular touch sensor 344. In some embodiments, an adhesive layer 352 including an adhesive material, such as epoxy, acrylic adhesives, hot melt adhesives, or the like, is positioned between the second guide face 332 and the first module face 338 to adhere the lights guides to the CTSM 334.

The CTSM 334 may be coupled to the main control board 312, and more specifically, the first module face 338 of the CTSM 334 may be interfaced with the second board face 316 of the main control board 312. The plurality of light sources 346, the plurality of touch sensors 344, and the plurality of light guides 324 may be disposed within the plurality of apertures 318 defined through the main control board 312. For example, as illustrated in FIG. 5, a pair of light sources 346, a discrete touch sensor 344 of the plurality of touch sensors 344, and a discrete light guide of the plurality of light guides 324 may be disposed within the particular aperture 318. Each light guide 324 may be positioned within a particular aperture 318 such that the radial gap (e.g., FIG. 5) is defined between the light guide 324 and the main control board 312 or between the light guide 324 and the septum 320 of the main control board 312. The light sources 346 may be positioned within the radial gap, such that they are positioned between the main control board 312 and the light guide 324, for instance, within the aperture 318.

As should be appreciated, the consumer icons 308 may be used as a touch point for a user to interact with (e.g., to selectively trigger operations of the laundry treatment appliance 100). The consumer icons 308 of the user interface assembly 300 may be selectively illuminated by the plurality of light sources 346 to communicate operation, status, or any other suitable information to the user. For instance, the plurality of light sources 346 may emit light emissions to or toward a first portion 326 of a particular light guide of the plurality of light guides 324. The first portion 326 may permit the light emissions to pass therethrough. The second portion 328 of the particular light guide may diffuse the light emitted through the first portion 326, for instance, to or toward a particular consumer icon 308 so as to evenly and completely illuminate each corresponding consumer icon.

As mentioned above, the main control board 312 and the septa 320 of the main control board 312 may advantageously prevent or mitigate light bleeding between adjacent consumer icons 308 (e.g., that may be commonly seen in existing user interface assemblies). For instance, main control board 312 may be constructed from an opaque material that may not permit light therethrough. In this regard, light emissions corresponding to a particular consumer icon 308 may not bleed over into an adjacent consumer icon 308. Thus, a particular consumer icon may be illuminated while adjacent consumer icons 308 are not illuminated. As an illustrative example, a user may interact with a particular consumer icon 308 of the laundry treatment appliance 100, for instance, to "wake" or illuminate the particular consumer icon 308. When the consumer icon 308 is touched or contacted by the user, the corresponding touch sensor 344 may detect a change in capacitance caused by the touch or contact. In such cases, in response to the detected touch or contact, the touch sensor 344 may send an illumination signal to the controller 322. The illumination signal may indicate a change in illumination status of the particular consumer icon. The controller 322 may then direct operation of light sources 346 corresponding to the particular consumer icon 308. During operation, the light sources 346 may emit light to or toward a corresponding light guide 324. The corresponding light guide 324 may then direct the light to the corresponding consumer icon 308. As should be appreciated, only the particular consumer icon 308 may be illuminated as the septum 320 separating the adjacent aperture 318 may limit or mitigate light bleed between to the adjacent consumer icons 308.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A user interface assembly for a domestic appliance, the user interface assembly defining an axial direction and a radial direction, the user interface assembly comprising:
   a fascia comprising a consumer icon;
   a main control board coupled to the fascia, the main control board defining an aperture therethrough, the aperture aligned with the consumer icon along the axial direction;
   a light guide disposed within the aperture, the main control board and the light guide defining a perimeter gap therebetween; and
   a capacitive touch sensor module (CTSM) electrically coupled to the main control board, the CTSM comprising a capacitive touch sensor and a light source, the capacitive touch sensor aligned with the consumer icon along the axial direction,
   wherein the light source is positioned within the perimeter gap and surrounded by the aperture.

2. The user interface assembly of claim 1, wherein the fascia comprises a first panel face and a second panel face spaced apart along the axial direction, wherein the main control board comprises a first board face and a second board face, wherein the CTSM comprises a secondary control board, wherein the secondary control board comprises a first module face and a second module face, wherein the second panel face is interfaced with the first board face, and wherein the second board face is interfaced with the first module face.

3. The user interface assembly of claim 2, wherein the capacitive touch sensor is disposed at the first module face, wherein the light guide comprises a first guide face and a second guide face spaced apart along the axial direction, wherein the first guide face is interfaced with the second panel face, and wherein the light guide is adhered to the first module face over the capacitive touch sensor.

4. The user interface assembly of claim 2, wherein the light source comprises a proximal end at the first module face and a distal end spaced apart from the proximal end along the axial direction, and wherein the distal end is positioned between the second panel face and the first module face along the axial direction.

5. The user interface assembly of claim 2, wherein the main control board comprises a controller mounted thereto, wherein the CTSM comprises one or more connection pads mounted to the first module face, and wherein the controller is operably coupled to the capacitive touch sensor and the light guide via the connection pads.

6. The user interface assembly of claim 1, wherein the light guide comprises a first portion and a second portion, wherein the first portion is positioned around the second portion along the radial direction, wherein the first portion comprises a transparent material, and wherein the second portion comprises a diffusive material.

7. The user interface assembly of claim 6, wherein the light source is interfaced with the first portion of the light guide.

8. The user interface assembly of claim 1, wherein the consumer icon comprises a dielectric material.

9. The user interface assembly of claim 1, wherein the light source comprises a side-emitting light emitting diode.

10. A domestic appliance comprising:

a cabinet forming a receiving space; and a user interface assembly provided on the cabinet, the user interface assembly defining an axial direction and a radial direction, the user interface assembly comprising:

a fascia comprising a consumer icon, a main control board coupled to the fascia, the main control board defining an aperture therethrough, the aperture aligned with the consumer icon along the axial direction, a light guide disposed within the aperture, the main control board and the light guide defining a perimeter gap therebetween, and a capacitive touch sensor module (CTSM) electrically coupled to the main control board, the CTSM comprising a capacitive touch sensor and a light source, the capacitive touch sensor aligned with the consumer icon along the axial direction, wherein the light source is positioned within the perimeter gap and surrounded by the aperture.

11. The domestic appliance of claim 10, wherein the fascia comprises a first panel face and a second panel face spaced apart along the axial direction, wherein the main control board comprises a first board face and a second board face, wherein the CTSM comprises a secondary control board, wherein the secondary control board comprises a first module face and a second module face, wherein the second panel face is interfaced with the first board face, and wherein the second board face is interfaced with the first module face.

12. The domestic appliance of claim 11, wherein the capacitive touch sensor is disposed at the first module face, wherein the light guide comprises a first guide face and a second guide face spaced apart along the axial direction, wherein the first guide face is interfaced with the second panel face, and wherein the light guide is adhered to the first module face over the capacitive touch sensor.

13. The domestic appliance of claim 11, wherein the light source comprises a proximal end at the first module face and a distal end spaced apart from the proximal end along the axial direction, and wherein the distal end is positioned between the second panel face and the first module face along the axial direction.

14. The domestic appliance of claim 11, wherein the main control board comprises a controller mounted thereto, wherein the CTSM comprises one or more connection pads mounted to the first module face, and wherein the controller is operably coupled to the capacitive touch sensor and the light guide via the connection pads.

15. The domestic appliance of claim 10, wherein the light guide comprises a first portion and a second portion, wherein the first portion is positioned around the second portion along the radial direction, wherein the first portion comprises a transparent material, and wherein the second portion comprises a diffusive material.

16. The domestic appliance of claim 15, wherein the light source is interfaced with the first portion of the light guide.

17. The domestic appliance of claim 10, wherein the consumer icon comprises a dielectric material.

18. The domestic appliance of claim 10, wherein the light source comprises a side-emitting light emitting diode.

19. A user interface assembly for a domestic appliance, the user interface assembly defining an axial direction and a radial direction, the user interface assembly comprising:

a fascia comprising a first panel face and a second panel face spaced apart along the axial direction, the fascia further comprising a plurality of consumer icons extending between the first panel face and the second panel face;

a main control board comprising a first board face and a second board face spaced apart along the axial direction, the first board face coupled to the second panel face, the main control board defining a plurality of apertures therethrough, each aperture of the plurality of apertures being separated from an adjacent aperture of the plurality of apertures via a septum of the main control board, each aperture of the plurality of apertures aligned with a corresponding consumer icon of the plurality of consumer icons along the axial direction;

a plurality of light guides, each light guide of the plurality of light guides positioned within a discrete aperture of the plurality of apertures, each light guide of plurality of light guides and the discrete aperture of the plurality of apertures defining a radial gap therebetween, each light guide of the plurality of light guides comprising a diffusive portion and a translucent portion positioned around the diffusive portion; and a capacitive touch sensor module (CTSM) electrically coupled to the main control board, the CTSM comprising a secondary control board, the secondary control board comprising a first module face and a second module face spaced apart along the axial direction, the CTSM comprising a plurality of capacitive touch sensors disposed at the first module face, the CTSM comprising a plurality of light sources disposed at the first module face, the plurality of light sources positioned within the a radial gap around the plurality of capacitive touch sensors, wherein the plurality of light guides are each adhered to the first module face over a corresponding capacitive touch sensor.

20. The user interface assembly of claim 19, wherein the main control board comprises a controller mounted thereto, wherein the CTSM comprises one or more connection pads mounted to the first module face, and wherein the controller is operably coupled to the plurality of capacitive touch sensors and the plurality of light guides via the connection pads.

\* \* \* \* \*